Patented Apr. 13, 1926.

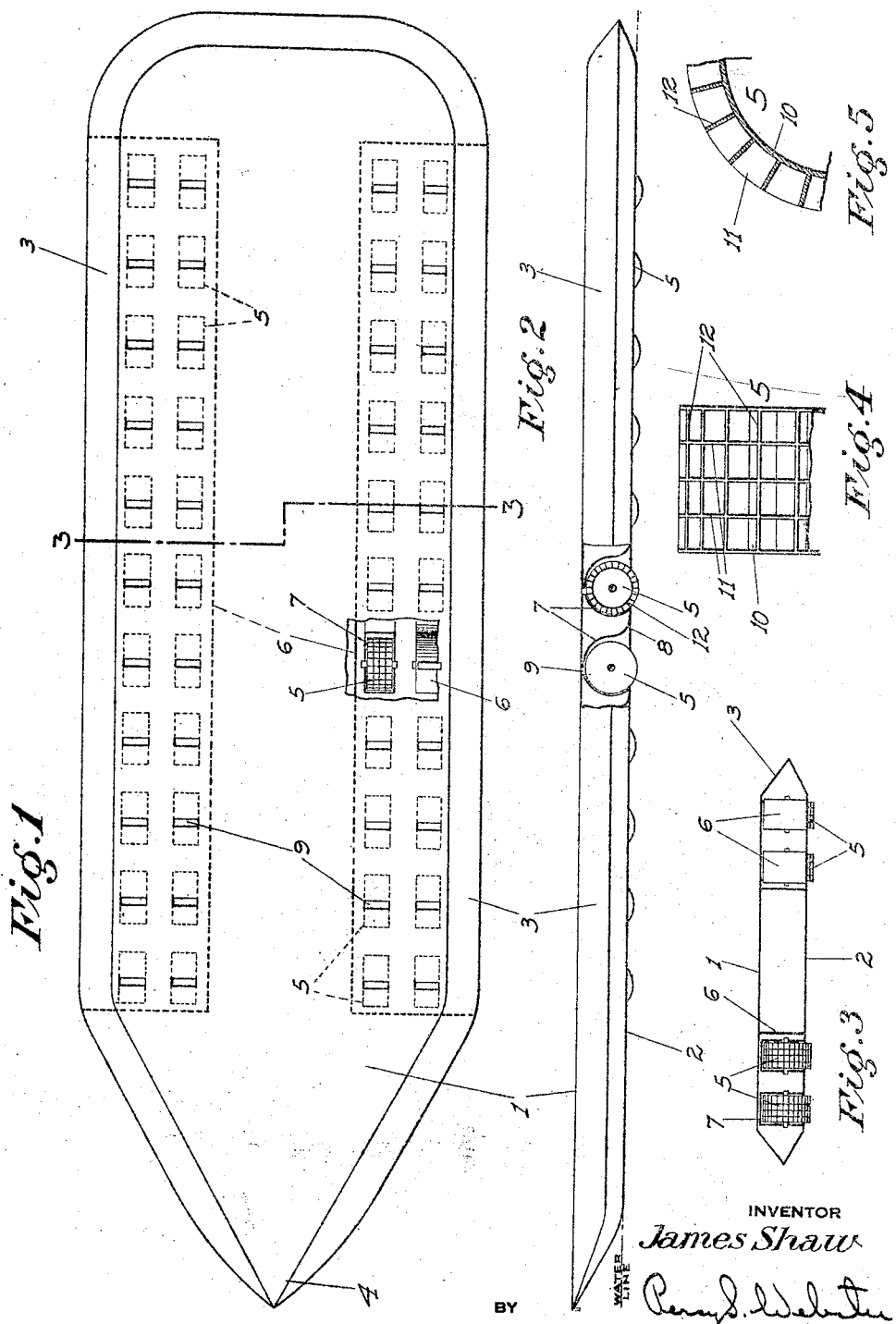

1,580,925

UNITED STATES PATENT OFFICE.

JAMES SHAW, OF LODI, CALIFORNIA.

WATER TRANSPORT.

Application filed August 30, 1924. Serial No. 735,062.

*To all whom it may concern:*

Be it known that I, JAMES SHAW, a citizen of the United States, residing at Lodi, county of San Joaquin, State of California, have invented certain new and useful Improvements in Water Transports; and I do declare the following to be a full, clear, and exact description of the same, reference being had to the accompanying drawings, and to the characters of reference marked thereon, which form a part of this application.

This invention relates to improvements in shipping, and particularly to ocean going vessels, my principal object being to provide a vessel propulsion means so constructed that when the vessel is in motion it will skim over rather than sink down into the water, thereby enabling a greater speed with less power being obtained than is at present possible with large vessels; and arranged so that practically the entire horse power applied to said propulsive means is transmitted without loss into the useful work of driving the vessel without the great slippage unavoidable with the ordinary screw propellers.

Another object is to construct a vessel of such form that it will be practically unaffected by waves of ordinary size, and seasickness will be practically eliminated.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a top plan view of the vessel.

Fig. 2 is a side elevation of the same, partly broken out.

Fig. 3 is a cross section on line 3—3 of Fig. 1.

Figs. 4 and 5 are fragmentary face and side elevations respectively of a propelling member.

Referring now more particularly to the characters of reference on the drawings, the hull of the vessel comprises upper and lower surfaces 1 and 2, the latter being perfectly flat for the major portions of their extent, while the upper surface 1 is practically flat throughout its extent. The sides 3 and stern portion of the vessel are of triangular cross section, with the apex facing outwardly and extending in a horizontal plane all around the vessel, except at and near the bow 4. The bow of the vessel tapers to a point, the bottom and apical lines of the sides sloping upwardly at a gentle angle to meet the front extremity of the upper surface or deck 1, as shown.

By reason of this construction, waves approaching bow-on, are flattened out and tend to pass under the vessel instead of sweeping over the deck. Similarly waves coming toward the vessel from abeam strike against the inwardly sloping sides below the apical lines also causing the waves to pass under instead of over the vessel.

Propulsion of the vessel is such that all available power is utilized, causing the vessel when under way to skim along the surface of the water. This propulsion is effected as follows:

Arranged lengthwise of the vessel intermediate the ends thereof and inwardly of the sides is a plurality of paddle wheels 5 of peculiar construction, the axes of these wheels extending of course transversely of the vessel. I preferably employ a battery of these wheels on each side of the longitudinal center line of the vessel, each battery comprising a pair of longitudinal rows spaced apart transversely a suitable distance. Each battery would be enclosed as a whole in a surrounding bulkhead 6.

The wheels 5 all project below the bottom 2 for a certain distance and each is mounted in a casing or hood 7 open on the bottom. These hoods while substantially circular are somewhat eccentrically disposed relative to the wheels, diverging from the latter in a rearward direction and terminating at the rear in a reverse curve as shown at 8. This arrangement allows for the ready escape of the water from the wheel-pockets when said pockets are moving upwardly.

Each hood, ahead of its vertical center line, has an air intake 9.

The wheels 5 comprise solid faced cylinders 10 of hollow but air-tight interior construction. About the cylinders are transversely spaced vertical bands 11 dividing the outer surface of the cylinder into a number of circumferential channels. Extending across the channels at evenly spaced intervals are radial vanes or paddles 12 forming pockets with the cylinder and adjacent bands which are open only at their outer ends.

The wheels are connected in driving relation with any suitable form of power means, not shown, which would be mounted outside the housings 7.

In operation, with the wheels turning forwardly, air is drawn into the pockets above described through the intakes 9, which air is confined in said pockets, as the wheels rotate and bring the parts forming the pockets into contact with the water. Due to the pressure of the water on the air, the latter will be compressed, and due to the great number of wheels employed, a great lifting effect on the vessel as a whole will be had. Also due to the particular construction of the wheels themselves, I believe that once the vessel is fairly under way, the wheels will act on the water as though geared thereto, and without any relative slippage and churning of the water. All the available power applied to the wheels will therefore be utilized in a positive propelling movement.

The wheels are arranged to be driven at great speed, and this, combined with the great number of wheels employed and the peculiar construction thereof as above recited, will cause the vessel to rise to and skim along the surface of the water.

Therefore due both to the fact that the vessel may be considered as having little or no draft, and to the number and effectiveness of the propelling wheels, a great speed may be attained with small power, compared to the size and tonnage of the vessel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A water transport comprising a hull, such hull comprising flat top and bottom surfaces spaced apart, sides between said top and bottom members of triangular cross section, the apices of said sides facing outwardly and extending in a horizontal plane all about the hull, propulsive wheels arranged inwardly of the sides of the hull and projecting below the bottom thereof, and housings in which the wheels are individually mounted, said housings being open on the bottom.

2. Propulsive means for vessels comprising a wheel turnably mounted in the hull of the vessel, and projecting below the bottom thereof, said wheel having a plurality of peripheral pockets, a housing surrounding said wheels except for that portion thereof projecting below the hull, and an air intake leading from the atmosphere to the interior of the housing above the water line whereby air from the intake is confined in the pockets with their downward travel and brought with the rotation of the wheel into contact with the water.

3. A propelling structure for vessels including a housing in the hull of the vessel and open at the bottom thereof, and a paddle wheel turnably mounted in the housing, the latter being concentric with said wheel for the greater portion of its extent but at its rear end curving away from the wheel toward and merging with the bottom of the hull.

In testimony whereof I affix my signature.

JAMES SHAW.